(12) United States Patent
Sim

(10) Patent No.: US 6,213,880 B1
(45) Date of Patent: Apr. 10, 2001

(54) GAME PAD APPARATUS AND METHOD FOR NAVIGATION ON A DIGITAL VIDEO DISK (DVD) SYSTEM

(75) Inventor: Wong Hoo Sim, Singapore (SG)

(73) Assignee: Creative Technology, Ltd. (SG)

( * ) Notice: Subject to any disclaimer, the term of this patent is extended or adjusted under 35 U.S.C. 154(b) by 0 days.

(21) Appl. No.: 09/151,503

(22) Filed: Sep. 11, 1998

Related U.S. Application Data

(60) Provisional application No. 60/065,550, filed on Nov. 14, 1997.

(51) Int. Cl.[7] .................................................. A63F 13/02
(52) U.S. Cl. ................................... 463/37; 463/36
(58) Field of Search ..................... 463/37, 38, 36; 273/148 B; 341/20, 22, 176; 369/24, 27; 345/156, 168

(56) References Cited

U.S. PATENT DOCUMENTS

| | | | |
|---|---|---|---|
| 5,394,168 | 2/1995 | Smith, III et al. | 345/156 |
| 5,699,059 | * 12/1997 | Hiller | 341/22 |
| 5,749,735 | * 5/1998 | Redford et al. | 434/307 R |
| 5,874,906 | * 2/1999 | Willner et al. | 341/22 |
| 5,896,125 | * 4/1999 | Niedzwiecki | 345/168 |
| 5,977,886 | * 11/1999 | Barlie et al. | 341/20 |

FOREIGN PATENT DOCUMENTS

| | | |
|---|---|---|
| 0 654 289 A1 | 4/1994 | (EP) . |
| 0 686 973 A1 | 12/1994 | (EP) . |
| WO 97/00713 | 1/1997 | (WO) . |

* cited by examiner

*Primary Examiner*—Valencia Martin-Wallace
*Assistant Examiner*—Julie Kasick
(74) *Attorney, Agent, or Firm*—Fenwick & West LLP

(57) ABSTRACT

The game pad 100 of the present invention allows a user 340 to control games requiring a keyboard 401 or a joystick, applications requiring a mouse input, and DVD-players 332. The game pad 100 provides complete application-specific programmability by the use of a translator module 368 and keymap files 362. A user 340 can customize the game pad 100 to generate the commands used by an application 366 by defining a keymap file 362 for the application 366. Then, the activation of a game or application 366 is detected, and the corresponding keymap file 362 is loaded into memory, thus allowing the game pad 100 to seamlessly control the application using the user-defined commands. Multiple keystrokes or commands may be assigned to each button 110, and multiple keymap files 362 may be created for each application 366. DVD navigation capability is fully integrated with game pad 100, including printing navigation icons on the game pad 100 and providing both keyboard and mouse mapping for the game pad 100 to allow complete DVD-player 332 control.

16 Claims, 13 Drawing Sheets

GAME PAD APPARATUS AND METHOD FOR NAVIGATION ON A DIGITAL VIDEO DISK (DVD) SYSTEM

RELATED APPLICATIONS

This application claims priority from provisional application 60/065,550, filed Nov. 14, 1997, entitled "Game Pad Apparatus and Method for Navigation on a Digital Video Disk (DVD) System".

BACKGROUND OF THE INVENTION

1. Field of the Invention

The present invention relates to input devices for computer systems, video games and other electronic devices. More particularly, the present invention relates to a game pad device that can be used both for playing games, and also for controlling digital video disk (DVD) systems, via software.

2. Description of Related Art

Computer applications are produced by an endless variety of manufacturers and developers. The commands to control these applications are as diverse as the numbers of applications themselves. In the field of computer gaming, for example, a user must learn one set of commands to play one game, and another set of commands to play another game. To make matters more complicated, each application may also use different input devices. If a user owns a game that requires keyboard entries, a game requiring a joystick, a Digital Video Disk (DVD) player requiring specific keyboard commands, and an internet browser requiring mouse commands, the user must have two or three different input devices coupled to the user's computer. Switching between applications entails switching between input devices, or, more likely, coupling and decoupling input devices from the computer as most computers only have a limited amount of input/output ports.

Conventional input devices and game pads have other drawbacks. Keyboards are bulky and typically have slow response time. Wireless remote input devices are expensive due to their wireless features, and they require an additional device to be coupled to the computer. Mousetype controllers require desktop space for control and to be fully effective. Moreover, mousetype controllers only have only two buttons, and in rare instances three, and complicated navigation requires more buttons than mouse-type controllers can provide. In particular, in order to control a DVD-player more than one button must be pressed sequentially. Conventional mouse controllers cannot provide this type of functionality. Although joysticks are useful input devices for controlling games, they are not useful for controlling other applications. Therefore, there is a need for an apparatus and method for using the same device to access video game machines, computers, and DVD systems.

SUMMARY OF THE INVENTION

The present invention overcomes the deficiencies of the prior art by providing a novel game pad (100). In the preferred embodiment, the game pad (100) is coupled to a memory (312) for storing at least one keymap file (362) and a translator module (368), a processor (300) for translating the signals generated by the game pad (100) in accordance with the translator module (368) and the stored keymap file (362) into commands in mouse protocol or keyboard protocol, and a DVD-player (332), for responding to the commands issued by the game pad (100). The keymap file (362) provides programmable mapping between game pad buttons (102) and application modules and DVD-player commands. In one embodiment, when the present invention detects that an application module (366) is activated, it loads the corresponding keymap file (362) into memory (312), thus allowing the game pad (100) to seamlessly control the application module (366) using the user-defined commands. Multiple keystrokes or commands may be assigned to each button (102), and multiple keymap files (362) may be created for each application module (366). The present invention fully integrates DVD navigation capability with a game pad (100), including printing navigation icons (201) on the game pad (100) for ease of use of the game pad (100) for controlling DVD functionality. Default keymap files (367, 390) may be created for mouse emulation and DVD-emulation to further ease user interaction. Thus, the game pad (100) of the present invention allows a game pad (100) to be used for playing games requiring a keyboard (401) or a joystick, for applications requiring a mouse input, and for navigating in a DVD system.

DETAILED DESCRIPTION OF THE PREFERRED EMBODIMENTS

Figure 1A:
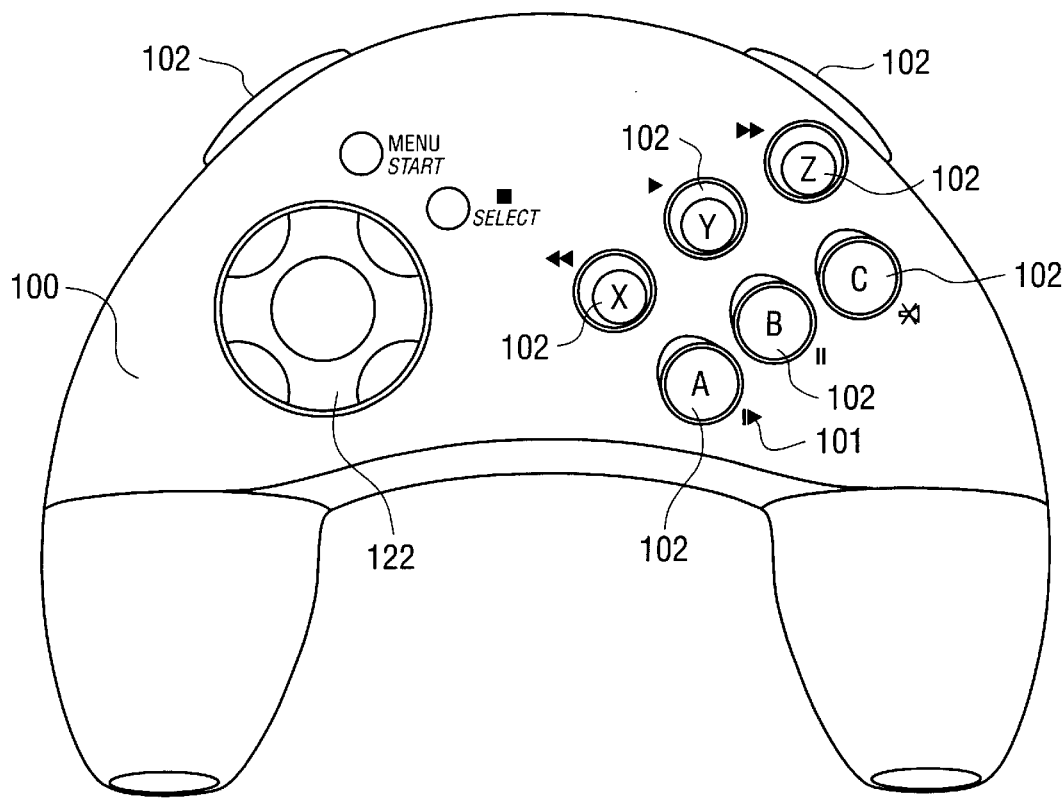
FIG. 1*a* is an illustration of an embodiment of the game pad 100 of the present invention in top view.
Figure 1B:
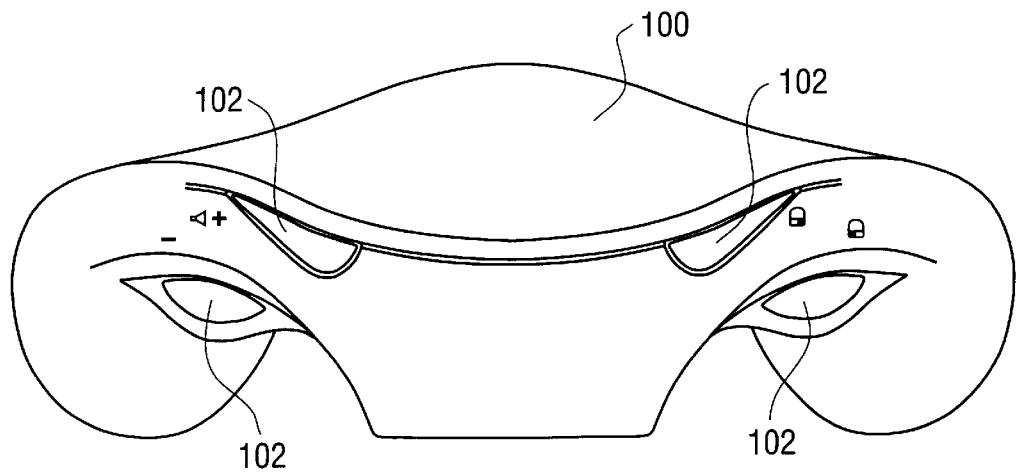
FIG. 1*b* is a front view of the game pad 100 of FIG. 1*a*.

FIG. 1*a* is an illustration of a preferred embodiment of a game pad 100 of the present invention in top view. The game pad 100 has a plastic housing having dimensions of approximately 5.9"×4.5"×1.5." The game pad 100 has twelve programmable buttons 102 (eight shown). The buttons 102 generate unique digital signals and are fully programmable. In the preferred embodiment, labels 101 identifying the use of a button 102 are associated with the buttons 102. For example, a button 102 that is programmed to generate a "Play" command to a DVD-player 332 has an arrow label 101 affixed to it, as shown in FIG. 1. The game pad 100 has a directional pad 122 used for simulating motion in game modules and for moving a cursor in applications using cursor-based movement. The game pad 100 additionally has a switch to change modes of the game pad 100. Preferably, this switch changes between analog joystick mode, digital mode, and inoperative mode. The game pad 100 can be constructed as a joystick, game pad, or any similar device embodying the features of the present invention. FIG. 1b illustrates a front view of game pad 100 and illustrates four other programmable buttons 102.

Figure 1C:
FIG. 1*c* is a table 370 illustrating an embodiment of the data structure used by the game pad 100 of the present invention.

FIG. 1c illustrates an exemplary data structure for the data transmitted by the game pad 100. In this structure, there are 6 data frames which comprise a single data packet. The first byte is for synchronization. The second data frame indicates the status of the up, down, right, and left buttons 102 of the game pad 100. The third data frame indicates the status of the start, select, L1, R1, and X buttons 102 of the game pad 100. The fourth data frame indicates the status of the Y, Z, A, B, and C buttons 102 of the game pad 100. The fifth data frame indicates whether the daisy-chain feature of the present invention is in operation. As shown in FIG. 1c, in the preferred embodiment, when a "1" is present as the second bit in the fifth data frame, the system knows the next data packet is for a second game pad 100. In order to determine whether the status of one of the buttons 102 has changed, the system 110 compares the state of the current bit for the button 102 to the previous state of the bit for that button 102. If the state of the bit is different, then the system 110 knows the button 102 has been pressed. Thus, for a single game pad 100, six data frames are transmitted; when a second game pad 100 is daisy chained, an additional six data frames, located behind the first six data frames, are transmitted as well.

Figure 2:
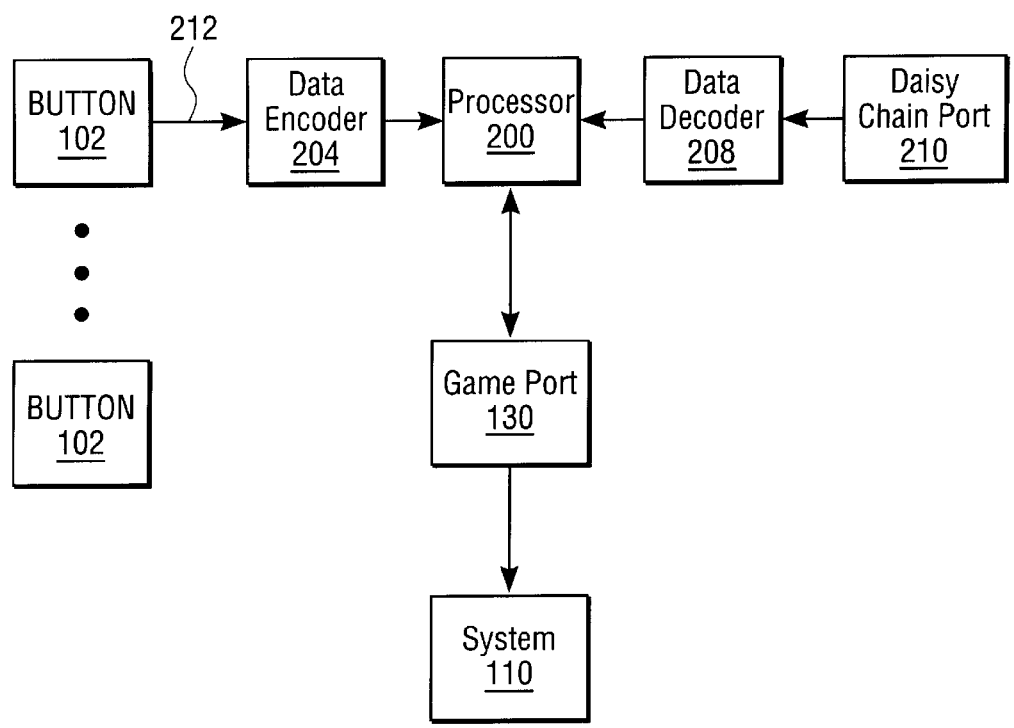
FIG. 2 is a block diagram illustrating a hardware embodiment of the game pad 100 in accordance with the present invention.

FIG. 2 illustrates a schematic of a preferred embodiment of the game pad 100 of the present invention. The power to the game pad 100 is supplied by a computer system 110 (not shown) to which it is coupled. The game pad 100 includes a microprocessor 200, a data encoder 204, and a data decoder 208, as well as buttons 102 and switches 212. When a user 340 (not shown) presses a button 102, a switch 212 coupled to the button is closed, and a signal is transmitted to the data encoder 204. When the user 340 releases the button 102, the switch 212 is decoupled, and the signal returns to zero. Both the data encoder 204 and decoder 208 take conventional form, and are typically implemented as a single integrated circuit with the microprocessor 200. The data encoder 204 encodes the signals transmitted from the buttons 102 in a non-return to zero format When the computer 110 polls the game pad 100 for status, the microprocessor 200 retrieves the encoded data and transmits it to the game port 130, where it is transmitted in turn to the system 110. If no button 102 has been pressed since the last poll, the data packet that is transmitted will be identical to the previous data packet. If a button 102 is pressed, then the state is changed for that button 102 by the encoder 204 upon detecting the presence of a signal transmitted by the button 102 through the closed switch 212. The changed state is transmitted as part of the next data packet. The format for the data packet is as shown in FIG. 1c.

A daisy-chain connector 210 is preferably provided with the system of the present invention. The daisy-chain connector 210 is preferably a female DB15 connector. The daisy-chain connector 210 is used to allow a second game pad 105 to be coupled to the first game pad 100 to provide dual control over application modules 366. Once the second game pad 105 is coupled, the game pad 100 sets the second bit in the fifth data frame of the data packet transmitted by the first game pad 100 to "1," as discussed above. In digital mode, the game pad 100 may be polled from 300 microseconds up to 750 microseconds for every call to obtain the status of a single game pad 100. When two game pads 100 are used, each game pad 100, 105 is polled at 750 microseconds for every call, to allow the system 110 to obtain status for both game pads 100, 105.

Figure 3:
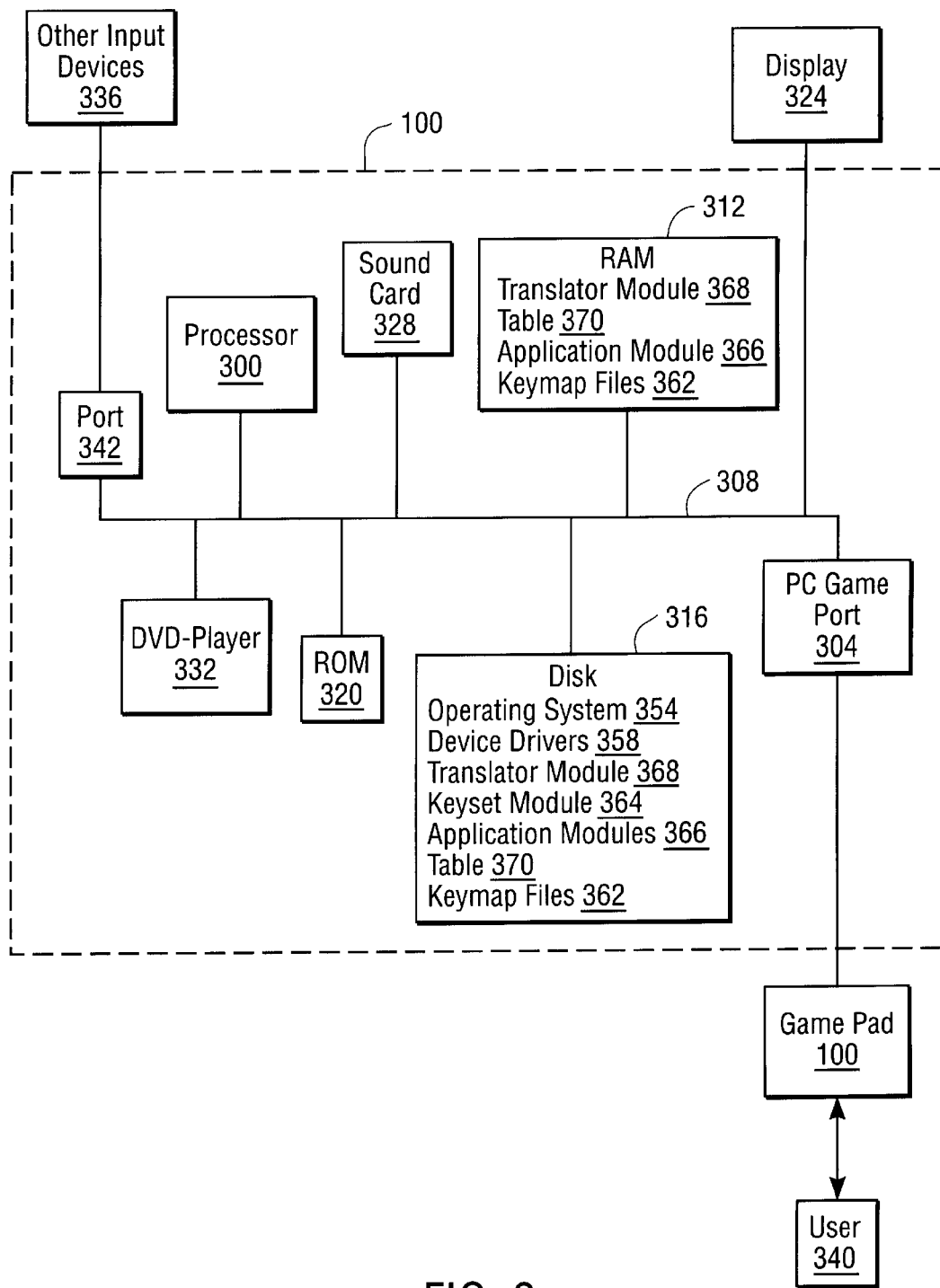
FIG. 3 is a block diagram of hardware embodiment of a computer system 110 in accordance with the present invention.

FIG. 3 is a block diagram of an embodiment of a computer system 110 embodying the present invention. The game pad 100 is coupled to a conventional International Business Machines (IBM) Personal Computer (PC) game port 304. The port 304 is coupled to a bus 308. Also coupled to bus 308 is a processor 300, random access memory (RAM) 312, a disk 316, read only memory (ROM) 320, a display 324, sound card 328, input devices 336, and a digital video disc player ("DVD") 332. The processor 300 preferably performs in accordance with an Intel 386DX40 processor or higher models. The sound card 328 is preferably a sound card 328 developed by Creative Technologies, Inc. if the system is sold outside of Japan, and is preferably an NEC sound card 328 or a Creative Technologies sound card 328 if sold in Japan. However, other sound cards may also be used in accordance with the present invention. The display 324, RAM 312, ROM 320, and disk 316, are all conventional components. A computer 110 employing the present invention should have at least four megabytes of RAM 312. Preferably, eight megabytes of RAM 312 are used in order to enhance the functionality of the present invention. The DVD player 332 is also conventional. A preferred DVD-ROM player is the BLASTER CD-ROM drive manufactured by Creative Technologies, Inc. The DVD player 332 is typically a DVD-ROM drive coupled to bus 308. However, the DVD player 332 can also be an external device coupled to the computer via cable. Input device 336 is a mouse 403, keyboard 401, or joystick, which are typically used to control the functionality of computer 110, and is coupled to bus 308 through port 340.

User 340 manipulates the game pad 100 to interact with application modules 366 stored on disk 316. Disk 316 stores application modules 366, operating systems 354, device drivers 358, table 370, a keyset module 364, a translator module 368, and keymap files 362. When a specific module is needed by the processor 300, the processor 300 retrieves the module from disk 316 and stores it in RAM 312 for faster access. Thus, in one embodiment when the present invention is being executed, RAM 312 contains keymap file 362, translator module 368, table 370, and application module 366. Application modules 366 include video games, DVD files, internet web browsers, spreadsheets, and word processing programs. Operating system 354 is preferably the Windows 95 system developed by the Microsoft Corporation of Redmond, Wash. However, other operating systems 354 may also be used in conjunction with the present invention.

Figure 4:
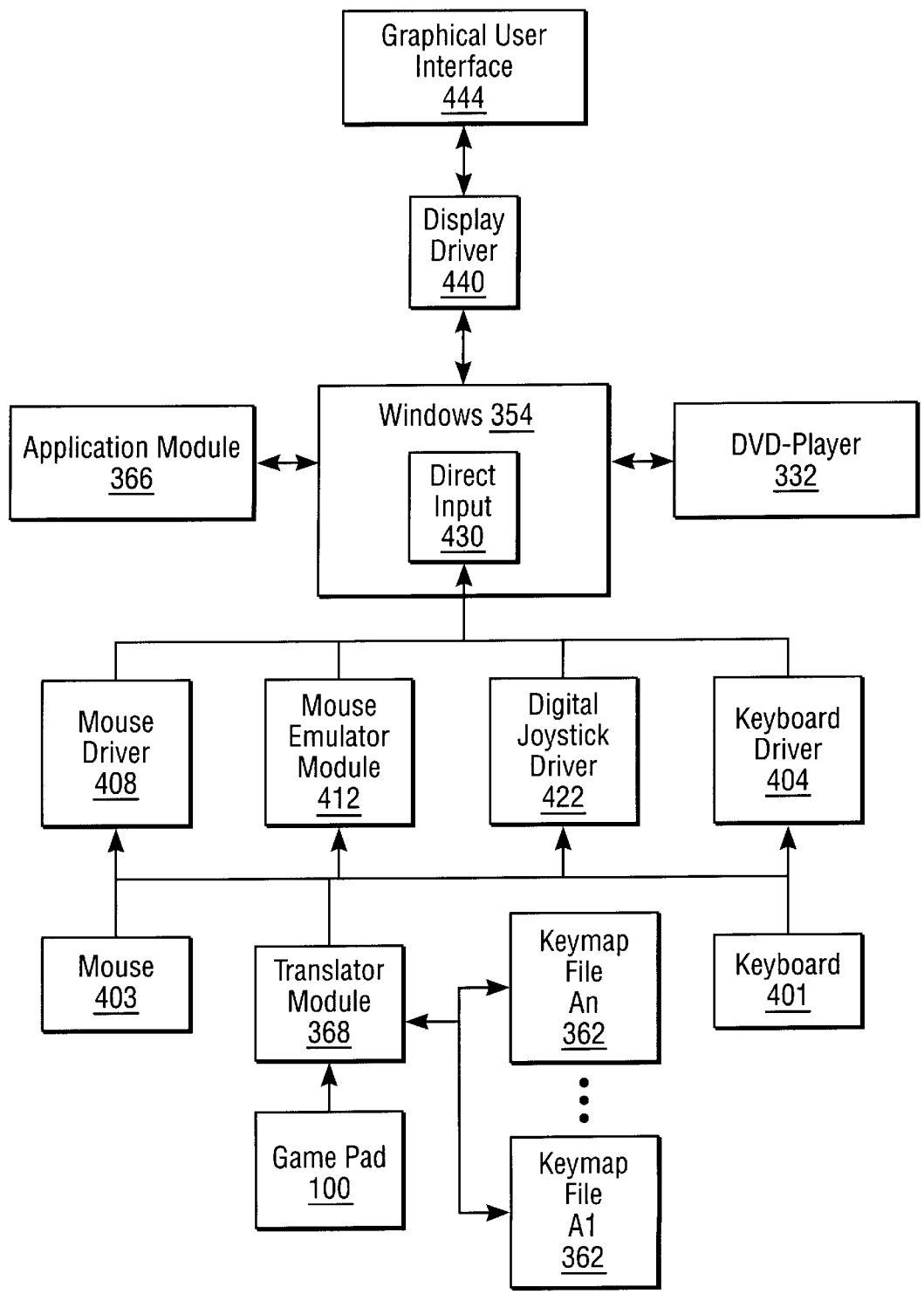
FIG. 4 is a functional block diagram illustrating the processing of operating system 354 in accordance with the present invention.

In accordance with the present invention, game pad 100 replaces the input device 336 in controlling the functionality of computer 110. As shown in FIG. 4, in a preferred embodiment, Windows system 354, input devices 336, 100 use control modules called device drivers 358 stored on disk 316 to interact with application modules 366. These device drivers 358 receive the signals present at port 304, port 342 and convert them into a protocol that is recognizable by the Windows operating system 354. Each input device 336, 100 generates different signals in different protocols, so each device 336, 100 has its own device driver 358. For example, a keyboard input device 401 has a keyboard device driver 404. A mouse input device 403 has a mouse device driver 408. If multiple input devices 336 are present in a system 110, there are multiple device drivers 362. The game pad 100 performs the functions of the other input devices 336 by sending commands to a translator module 368, which transmits the translated signals to the keyboard and mouse device drivers 404, 408. Mouse and keyboard drivers 408, 404 convert the translated commands into signals recognized by the operating system 354, in accordance with their conventional operation. Joystick driver 422 converts the input signals received at the game port 304 into digital joystick status information. In one embodiment, the game pad 100 creates its own custom mouse emulator module 412. The custom mouse emulator module 412 co-exists with the drivers of the present invention, allowing the game pad 100 to communicate directly with the custom mouse emulator module 412. This provides one method of mouse emulation capability to game pad 100.

Multiple keymap files 362 are coupled to a translator module 368. These keymap files 362 are used by the translator module 368 to translate commands transmitted by the game pad 100 into commands that control specific application modules 366 or devices such as DVD-player 332. For example, if user 340 has a DVD-Player 332 installed in the computer system 110, then commands entered into the game pad 100 are translated by the translator module 368 using the appropriate keymap file 362 into commands recognizable by the DVD-player 332. If user 340 has set button A to represent the "Play" command, for example, and "Play" is initiated by the keyboard button "P," then when user 340 presses button A, the button A signal is translated into the "P" keyboard command, and is sent to the computer system 110 which routes the "P" command in its normal process to the DVD-player 332, which will then begin to play the disk, as described below. Similarly, the keymap files 362 may also be used to define commands for specific games, or other application modules 366.

In the preferred embodiment, the drivers 404, 408, 412, 422 communicate with the DirectInput interface 430 developed by Microsoft Corporation. The Direct Input interface 430 specifies a specific protocol for input devices 100, 336 to comply with in order to communicate with an application module 366 or operating system 354. More specifically, the input devices 100, 336 communicate with a DirectInputDevice object created for each input device 100, 336. The function CreateDevice is defined in Direct Input 430 as the function used for creating DirectInputDevice objects. In order to create a DirectInputDevice object, a GUID (Global Unique Identifier as defined by Microsoft™ Corporation) must be defined for the input device 100, 336. For game pad 100, a GUID must be defined for the game pad 100 as a joystick. In an embodiment where the game pad 100 creates its own custom mouse emulation module 412, a GUID must be created for the mouse emulation module 412 as well. Currently, DirectInput 430 predefines two GUIDs, GUID_SysKeyboard, and GUID_SysMouse. Thus, when creating the mouse emulation module 412, the GUID_SysMouse must be included. In order to install the game pad 100 as a joystick, a second GUID must be defined. In order to do this, the EnumDevices function is called using the joystick type as the parameter (DIDEVYPE_JOYSTICK). If the computer system 110 already has a mouse 403 as an input device 336, then the EnumDevices is used to enumerate the mouse embodiments of the game pad 100. The parameter DIDEVTYPE_MOUSE is used to provide a mouse GUID for the game pad 100.

After DirectDeviceObjects are created for game pad 100, a data structure for the game pad 100 must be specified. The data structure controls a plurality of aspects of the input device, including axis information, whether relative or coordinate information should be used, as well as other parameters of input devices 336 known to those skilled in the art. For the game pad 100, the data format structure includes the range and motion parameters of the game pad 100. A pointer for the data structure is used to keep track of the multiple button keymapping of the game pad 100. The structure information is saved as bin format in the keymap files 362. Once the translator module 368 and the keymap files 362 are stored in memory, the game pad 100 is able to control any application module 366 using the DirectInput interface 430. In the preferred embodiment, after installation of the translator module 368, an icon is shown in the Windows Taskbar to indicate that the translator module 368 is in operation. Other computer systems 110 and architectures may also be used in accordance with the present invention, as the interaction between the operating system 354 and the device drivers 358 is not critical to the operation of the present invention. As described herein, in the preferred embodiment, the commands generated by the game pad 100 are translated prior to being transmitted to the operating system 354 or device drivers 358. Thus, the computer system 110 only has to process the transmitted commands in its conventional manner, and no enhanced functionality or specific architecture is required.

Figure 5A:
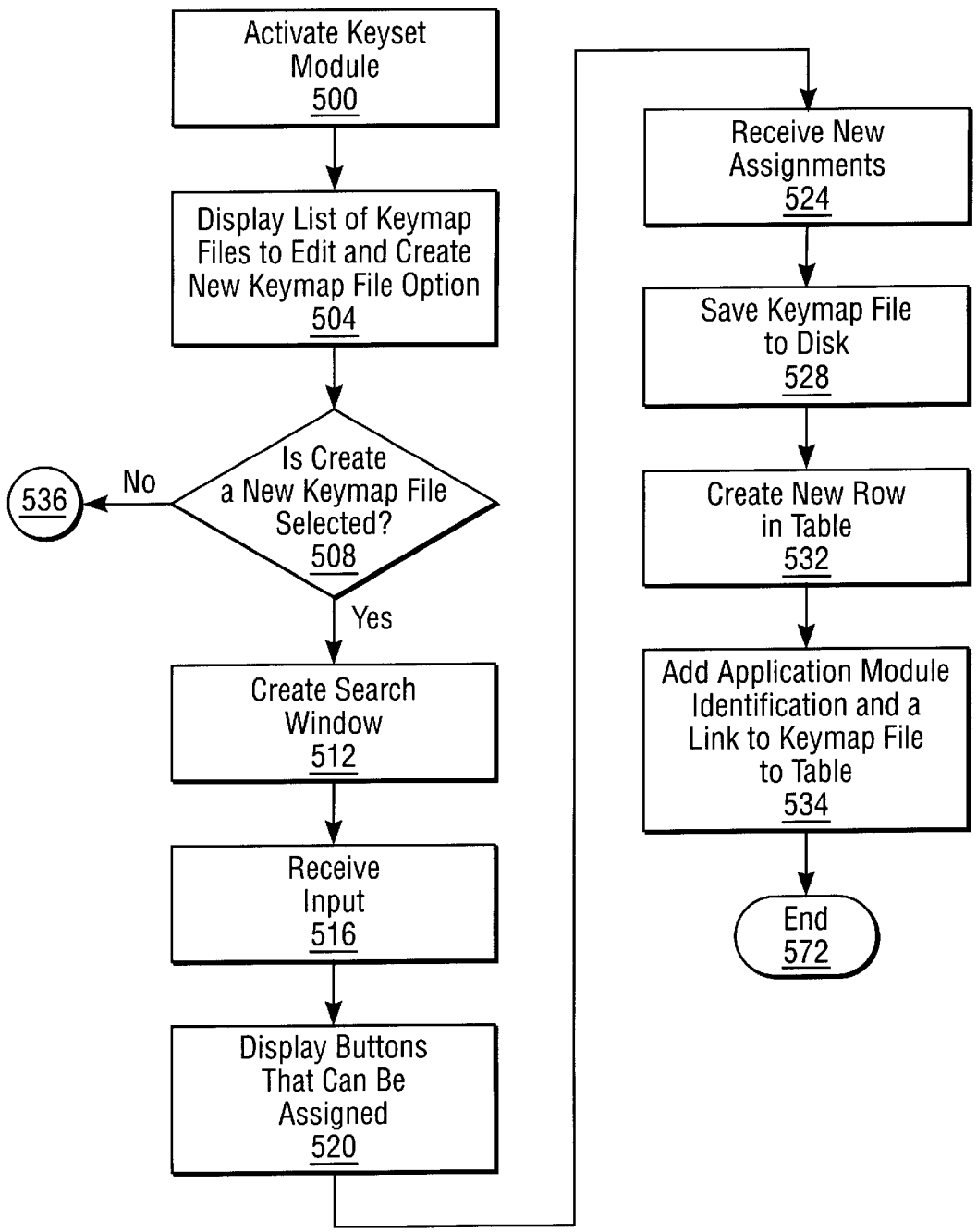
FIG. 5*a* is a flowchart illustrating the process of creating new keymap files 362 in accordance with the present invention.
Figure 6:
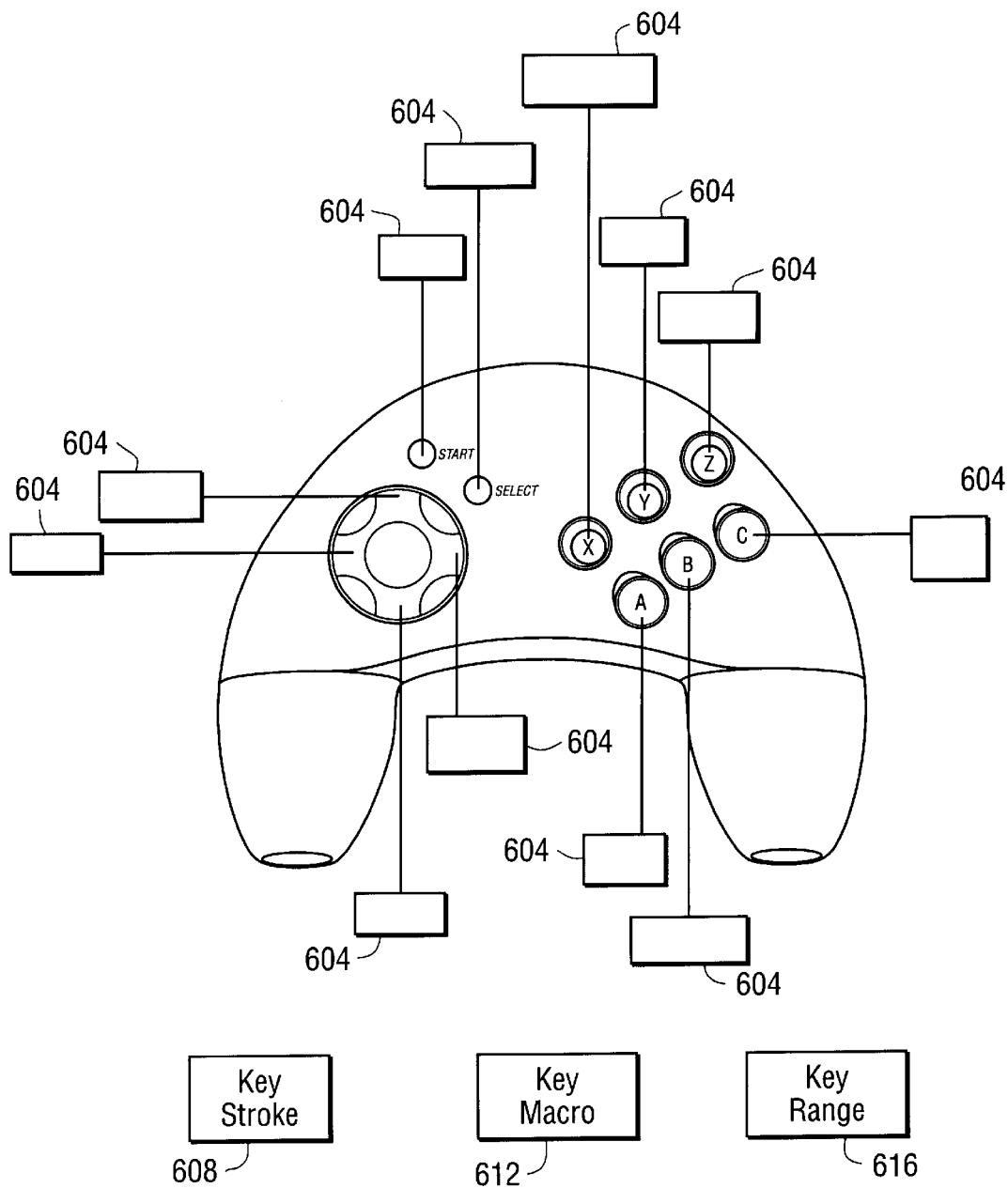
FIG. 6 is an illustration of a preferred user interface for assigning commands to the game pad 100.

FIG. 5a is a flowchart illustrating the processing of assigning commands in accordance with the present invention. First, the user 340 must activate 500 the keyset module 364. The module 364 then displays 504 a list of keymap files 362 to edit and an option to create a new keymap file 362. A table 370 containing the names of the keymap files 362 is located on disk 316, and is accessed to create the list. The system determines 508 if the create new keymap file option is selected. If the create new keymap file option is chosen, then a window allowing the user 340 to search for one of the application modules 366 is created 512. The user 340 selects an application module 366 to be controlled by the game pad 100, and the keyset module 364 receives 516 the input. A new row on the table 370 is created, with the identification of the application module 366 stored as an entry. The system then displays 520 the buttons 102 on the game pad 100 that can be assigned, as shown in FIG. 6. The user 340 selects a button 102, and then enters the key or mouse function the button 102 represents. For example, if the user 340 wants button A to be "enter", then the user 340 selects button A, and then presses the "enter" key on the user's keyboard 401. The system assigns the ASCII code for "enter" to button A. If the user 340 wants to assign a mouse click to a button, a predefined string m._click is assigned to the button. For example, in one embodiment, a left mouse button is a m.lclick. A right mouse button is a m.rclick. A middle mouse button is m.mclick. In the preferred embodiment, default assignments mapping mouse clicks to game pad buttons 102 are used. In this embodiment, the user 340 selects the mouse emulator option as displayed by the keyset module 364, and the module assigns button "A", "B", "C" as left, middle, and right mouse button clicks.

Additionally, multiple commands may be assigned to a single button. For example, if the user 340 wants the commands "Alt-M, Enter, Space Bar" to be performed by button C, then the user 340 selects button C, presses the Alt and M keys simultaneously, followed by the Enter and Space Bar keys. The keyset module 364 assigns those functions to be executed when button C is pressed, in that order. A key range may also be assigned. This allows the user 340 to select a range of keystrokes to be executed each time the designated button 102 is pressed. For example, if the commands, "Enter" and "Space Bar" were assigned as a key range to button A, then when button A is pressed once, "Enter" is generated, and when button A is pressed again, "Space Bar" is generated. If button A is pressed a third time, "Enter" is generated again. In order to create a key range, a separate create key range option must be selected by the user 340 from the keyset module 364. After the option is selected, the user 340 may define the key range for a button 102. The multiple commands are stored in the keymap table 372 described below.

The keymap file 362 preferably comprises a table 372 containing a list of buttons 102 in rows, and a corresponding number of columns which contain the command assignments of the buttons 102. Each time the user 340 assigns the command to a game pad button 102, the mouse command or keyboard command is added as a column in the game pad button row. After the keyset module 364 has received 524 new commands for the buttons of the game pad 100, the keyset module 364 saves 528 the keymap file 362 to disk 316. A link to the newly created keymap file 362 is stored 534 in the table 370 in a position corresponding to the row containing the identification of the application module 366.

In one embodiment, a predefined mouse emulation keymap file 367 is created for mouse emulation. This file 367 maps buttons A, B, and C to mouse buttons left, middle, and right, respectively, as described above. The directional pad 122 is mapped to the track ball movement of the mouse 403. Other buttons 102 on the game pad 100 may be programmed for other functions defined by the user 340. Thus, when user 340 wants to have mouse control of an application module 366, the user 340 can simply assign this mouse emulation keymap file 367 to the application module 366. The user 340 may reprogram the mapping in the mouse emulation keymap file 367 to suit the user's preferences.

Alternatively, the game pad 100 may install a mouse emulation module 412. When an application module 366 requiring mouse input is identified 704, then any command received by the game pad 100 may be sent to directly to the mouse emulator module 412. The mouse emulator module 412 converts the signal generated by the game pad 100 into the appropriate mouse command, and transmits this command to the DirectInput interface 430. Any buttons 102 not defined in the module 412 are ignored.

Figure 5B:
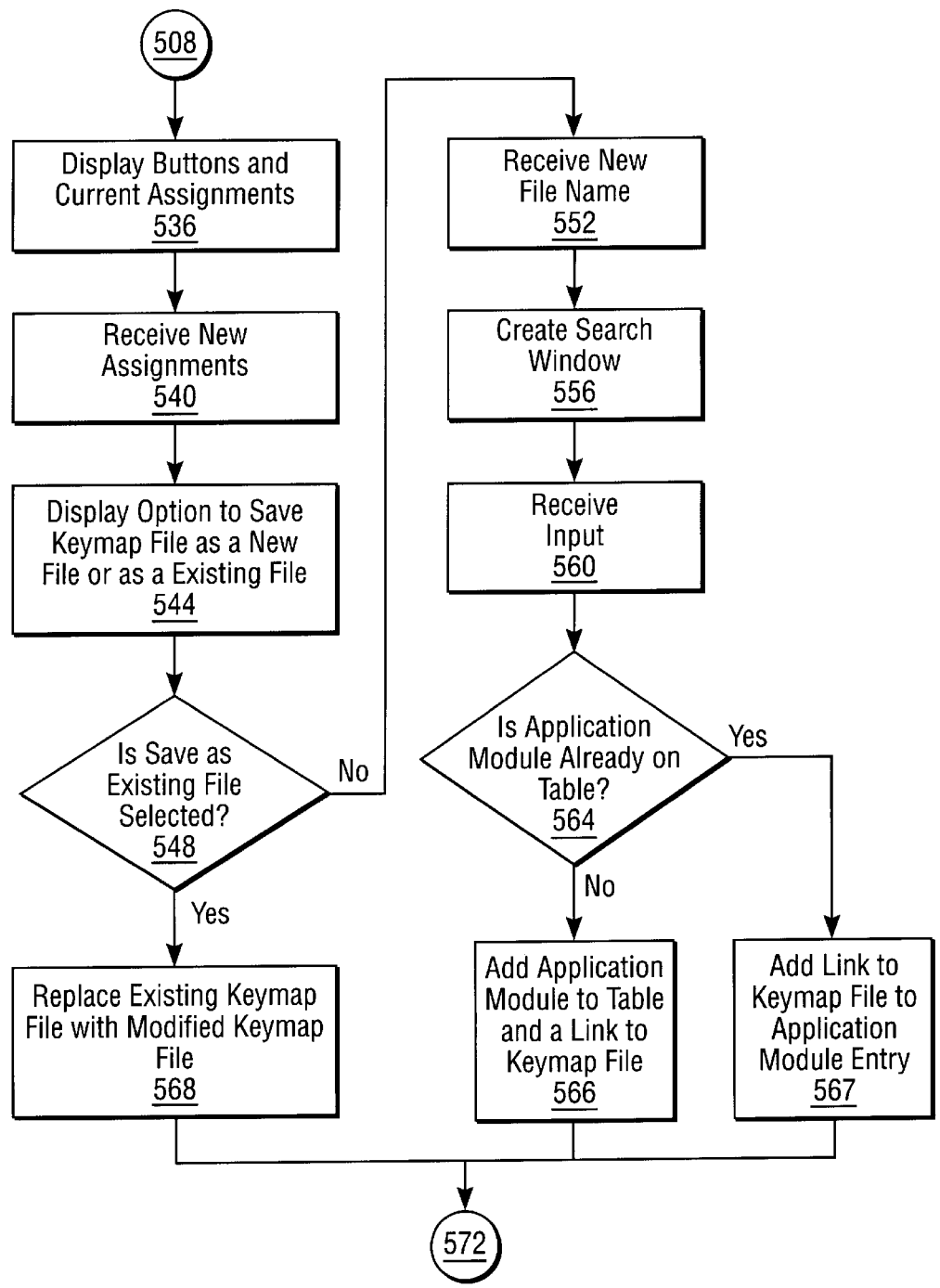
FIG. 5*b* is flowchart illustrating the process of assigning commands to existing keymap files 362 in accordance with the present invention.

As shown in FIG. 5b, if the user 340 chooses to create a keymap file 362 for an application module 366 that already has a keymap file 362 assigned to it, then the keyset module 364 loads the keymap file 362 into memory 312 and displays 536 the buttons that can be assigned along with their current command assignments, as shown in FIG. 6. The keyset module 364 receives 540 the new commands in the same process as described above, and the keyset module 364 displays 544 the option to save the new command assignments over the existing keymap file 362 or as a new keymap file 362 for that application module 366. The keyset module 364 determines 548 if the user 340 selects save as an existing keymap file 362. If so, the keyset module 364 replaces 568 the existing keymap file 362 with the newly created module 362 containing the new command assignments, and overwrites the link to the old keymap file 362 with a link to the new keymap file 362.

If the new file option is chosen, then the keyset module 364 receives 552 a new file name. Then the keyset module 364 displays a window in which the user 340 can select an application module 366 to assign the new keymap file 362. The keyset module 364 receives 560 input selecting the application module 366, and determines 364 whether the application module 366 is already in the table. An application module 366 may have multiple links to different keymap files 362. If the application module 366 is in the table 370, a link to the keymap file 362 is added 367 to the existing application module row. If the application module 366 is not on the table 370, the keymap file 362 is stored 566 in the table 370 in a new column corresponding to the row identifying the specified application module 366. In the multiple keymap file 362 situation, however, user 340 must choose which keymap file 362 to apply upon activating the application module 366 or translator module 368.

FIG. 6 illustrates a preferred graphical user interface 600 to be used in accordance with the present invention. As shown, command boxes 604 are displayed connected to the displays of the programmable buttons 102. By entering a command into the command box 604 connected to a specific button, the command will be executed upon pressing the button 102, as described above. Commands may be entered by typing command names or by pressing the appropriate keyboard, mouse, or game pad button. For example, the display of the directional pad 122 has command boxes for the up, down, left, and right directions. Thus, the user 340 can control the commands issued by the directional pad 122 when pressed in the up, down, left and right areas of the directional pad 122. A key stroke button 608, key macro button 612, and a key range button 616 are also displayed in the interface 600 to allow the user 340 to enable these functions.

Figure 7A:
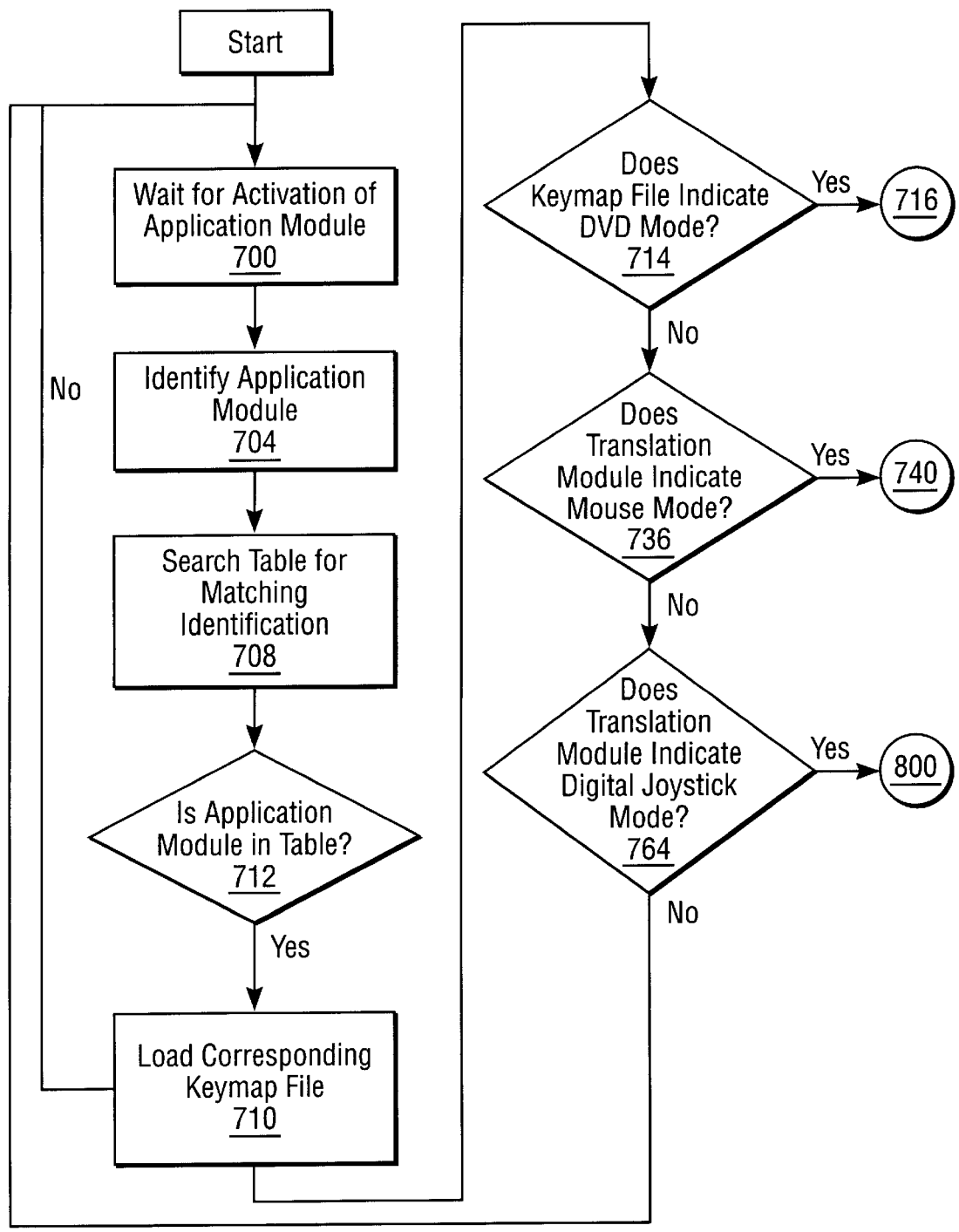
FIG. 7*a* is a flowchart illustrating an overview of the execution of the present invention where keymap files 362 are automatically loaded.

FIG. 7a illustrates an embodiment of the execution of the present invention in which keymap files 362 are automatically loaded in conjunction with their corresponding application module 366. A translator module 368 is preferably loaded into memory 312 upon activation of the computer 110. The translator module 368 waits 700 for the activation of an application module 366. Once an application module 366 is activated by the user 340, the translator module 368 identifies 704 the activated application module 366. After identifying the 704 the application module 366, the translator module 368 determines 712 if there is a keymap file 362 corresponding to the application module 366 by searching 708 the table 370 for a matching identification. If a matching application module 366 is found, its associated keymap file 362 is loaded 710 into memory 312.

Figure 7B:
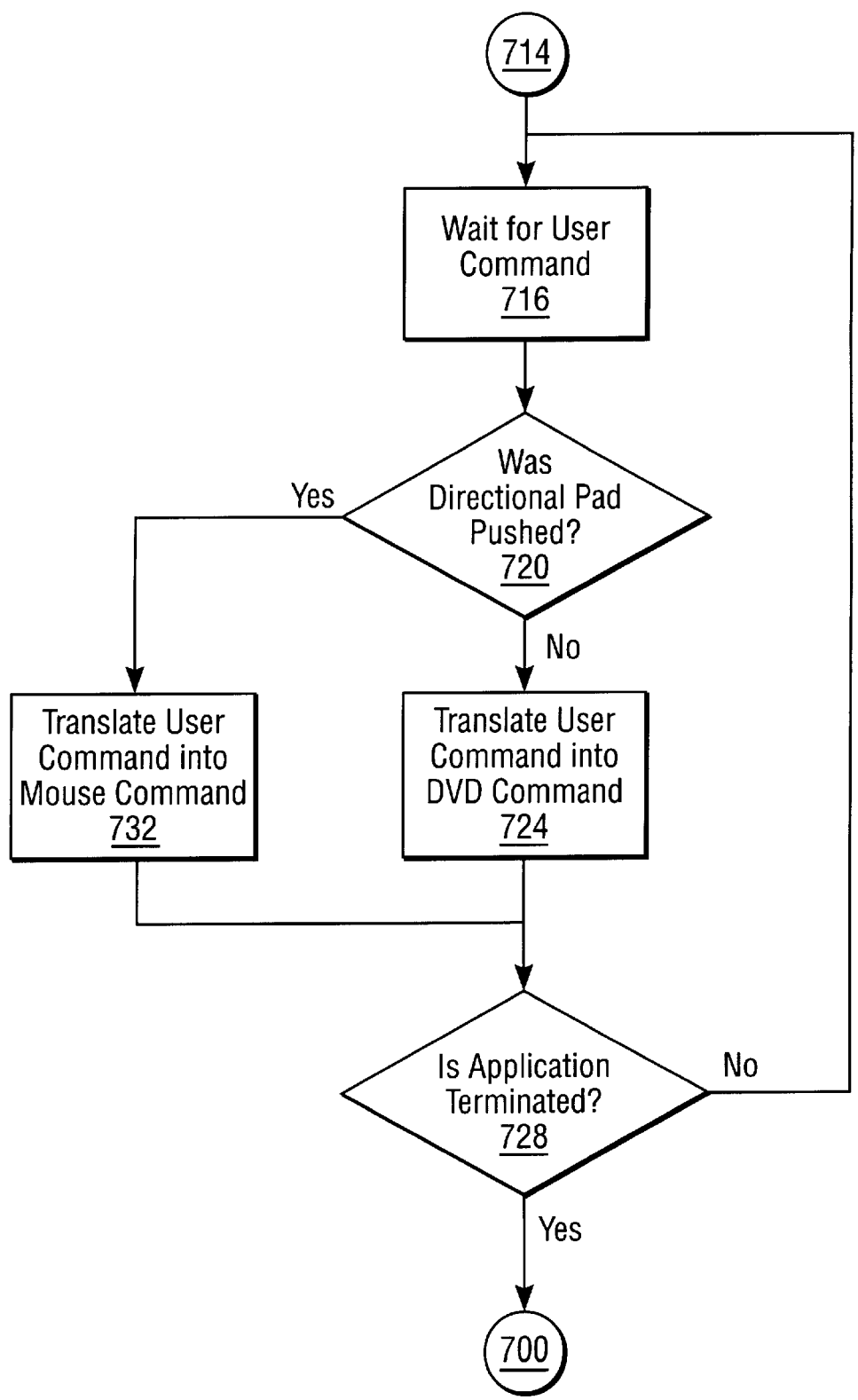
FIG. 7*b* is a flowchart illustrating the execution of the translator module 368 using a keymap file 362 for navigating within a DVD-system.

If the keymap file 362 indicates 714 that the application module 366 requires DVD input, the translator module 368 then waits 716 for the user 340 to use the game pad 100. as shown in FIG. 7b. After a command is entered, the game pad 100 generates a signal in response to the command. If the directional pad 122 was pressed 720, the translator module 368 translates 732 the direction into a mouse command by using the keymap file 362 to translate the directional pad signal into a mouse command. As described above, the translator module 368 knows when the directional pad 122 is pressed based upon comparing received data packets to previous data packets. Once a directional pad movement is detected, the translator module 368 simply examines the table 372 to determine the corresponding mouse command to issue. For example, if the directional pad is pushed "Up", then the mouse command Mup is sent. The command is sent to the mouse driver 408, and is then transmitted to the application module 366. If a game pad button 102 was pressed, then the game pad 100 generates the unique signal corresponding to the pressed button, and transmits it to the translator module 368 loaded into memory 312. The translator module 368 translates 724 the command in accordance with the assignments stored in the keymap file 362. The translated command is then sent to the computer system 110, which processes the translated command in its normal manner.

For example, a DVD-player 332 may have a "Pause" functionality. The DVD-player 332 expects to receive the command "Pause" in a certain protocol, for example, a keyboard command such as Alt-P. In this situation, then a button on the game pad 100, for example, button A, must have been assigned to generated the Alt-P command in accordance with the process illustrated in FIG. 5. The translator module 368 then receives the button A, and searches the keymap file 362 for the button A row, and finds the Alt and P commands are assigned to be generated simultaneously when button A is pressed. The translator module 368 transmits the Alt-P command string to the computer system 110, which processes the command as it would if the user 340 had simply pressed "Alt-P" on the keyboard 401. The DVD-player 332 upon receiving the Alt-P command from the computer system 110 will pause the video.

Figure 7C:
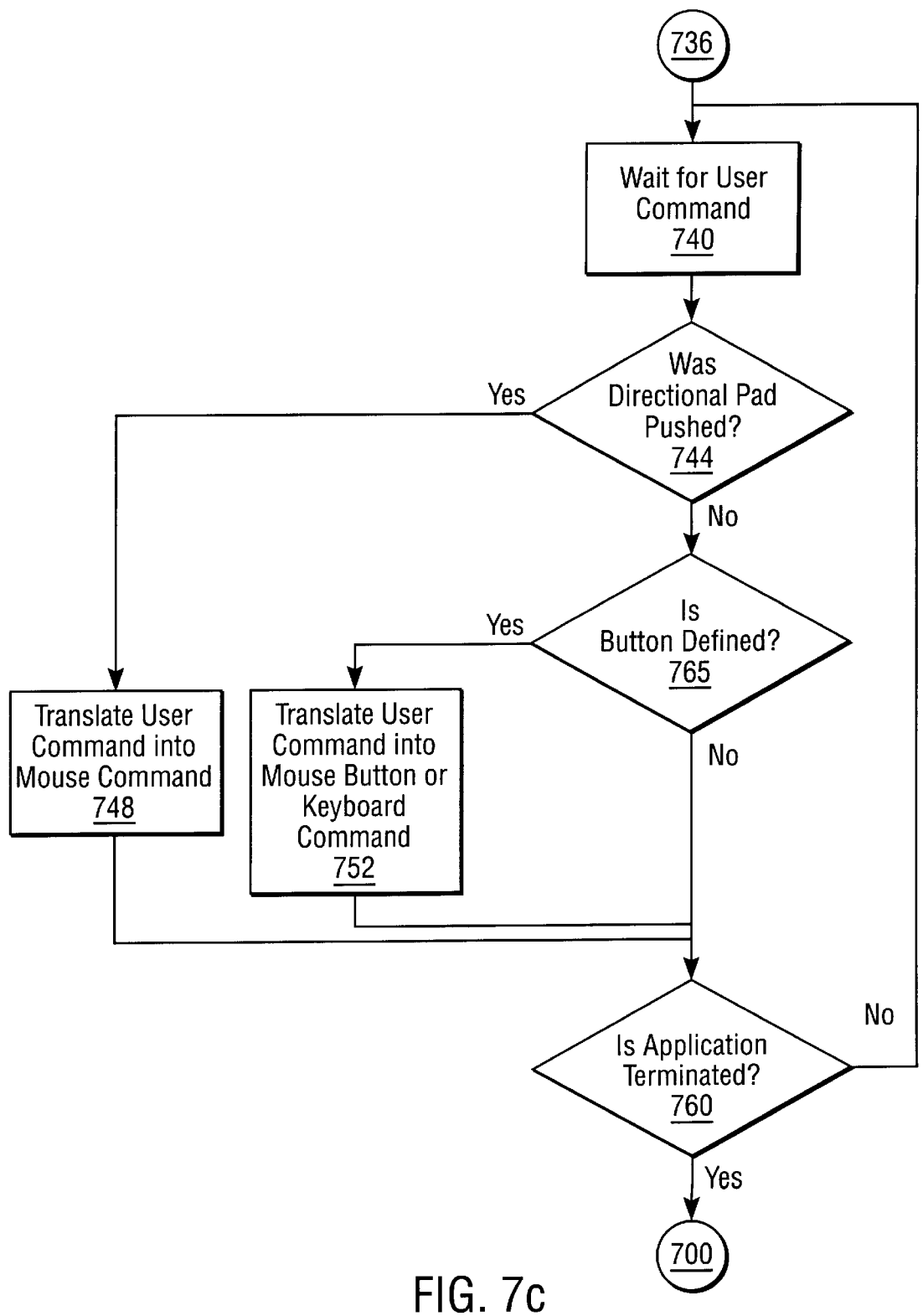
FIG. 7*c* is a flowchart illustrating the execution of the translator module 368 using a keymap file 362 for emulating mouse commands.

If the keymap file 362 is a mouse emulation keymap file 367, then the translator module 368 waits 740 for a user command, as shown in FIG. 7c. In response to the user input, the game pad 100 generates a signal. If the signal is generated in response to the directional pad 122 being pushed 744, the signal is translated 748 by the keymap file 367 into a mouse directional command and is sent to the computer system 110. If the signal is generated in response to a button 102 being pressed, then in the preferred embodiment, if the button "A", "B", or "C", was pressed, a "m.lclick", "m.mclick" or "m.rclick" command is transmitted respectively to the computer system 110. If another button is pressed, then the system determines if the button is defined in the keymap file 362. If the button is defined, the signal is translated 752 by the keymap file 362 into the defined keyboard command and is sent to the computer system 110. If the translator module 368 determines 756 that a button is pushed that was not designated, no command is sent to the driver and no command is executed. The translator module 368 then checks 760 to see if the application 366 has terminated. If it has, the process returns to step 700. If it has not, the process returns to step 740.

Figure 8:
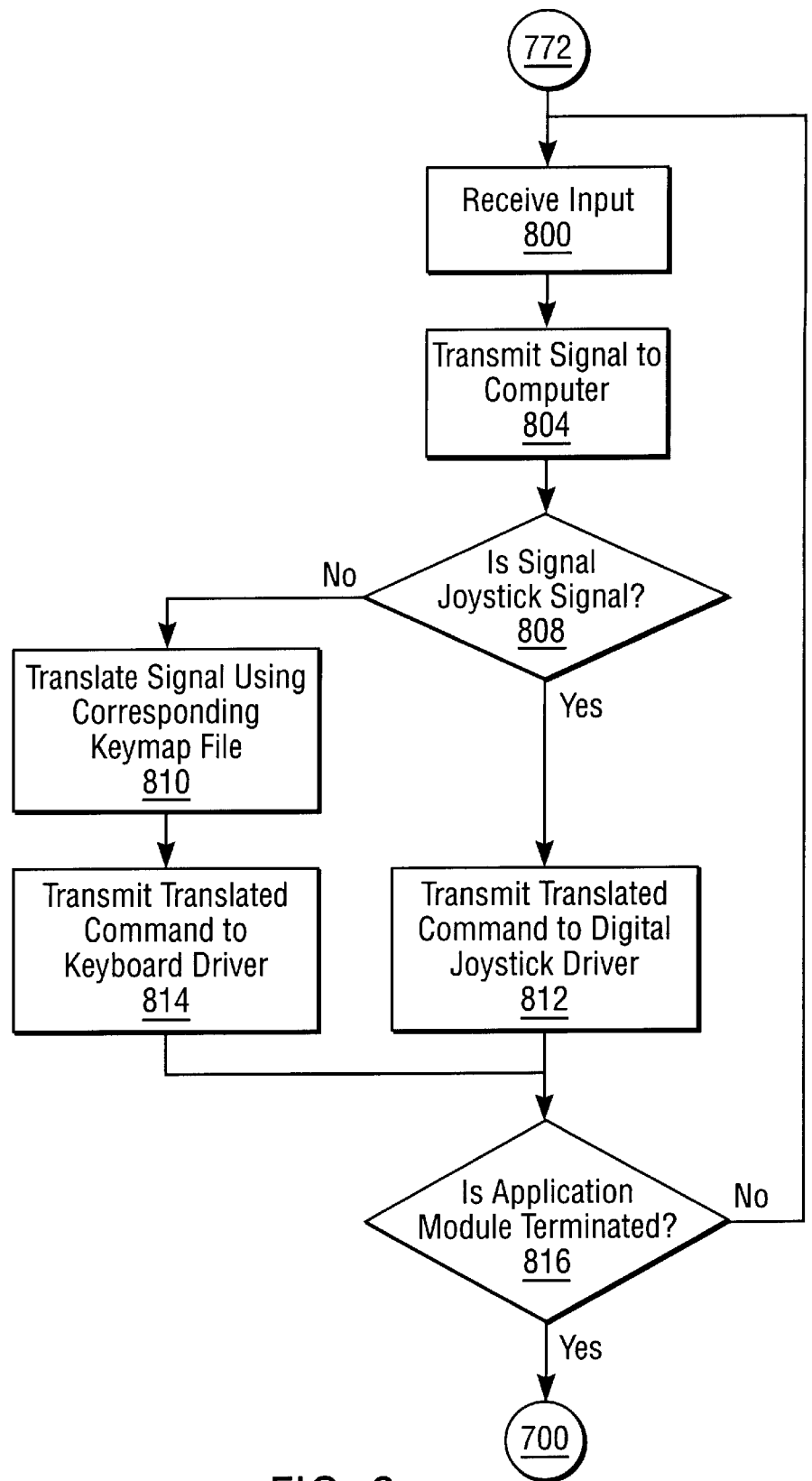
FIG. 8 is a flowchart illustrating the execution of the translator module 368 using a keymap file 362 for controlling a computer game or application module 366.

If the keymap file 362 indicates 764 that the application module 366 requires digital joystick mode, then the process as illustrated in FIG. 8 preferably occurs. The translator module 368 waits to receive 800 input. The game pad 100 generates a signal in response to the user input, and the signal is transmitted 804 to the translator module 368. The translator module 368 determines 808 of the signal represents directional pad or button commands. If the signal is a directional pad command, the system transmits 812 the signal to the system as a digital joystick DirectInput command. If the button assignments represent keyboard input, then the translator module 368 translates 810 the signals in accordance with the keymap file 362, and then sends 814 the translated command to the computer system 110. The computer system 110 transmits the commands to the application module 366 for execution upon polling by the application module 366. The system continues to translate commands until the application module 366 is terminated 816. At that point, the system returns to step 700, and waits for another application module 366 to be activated.

Figure 9:
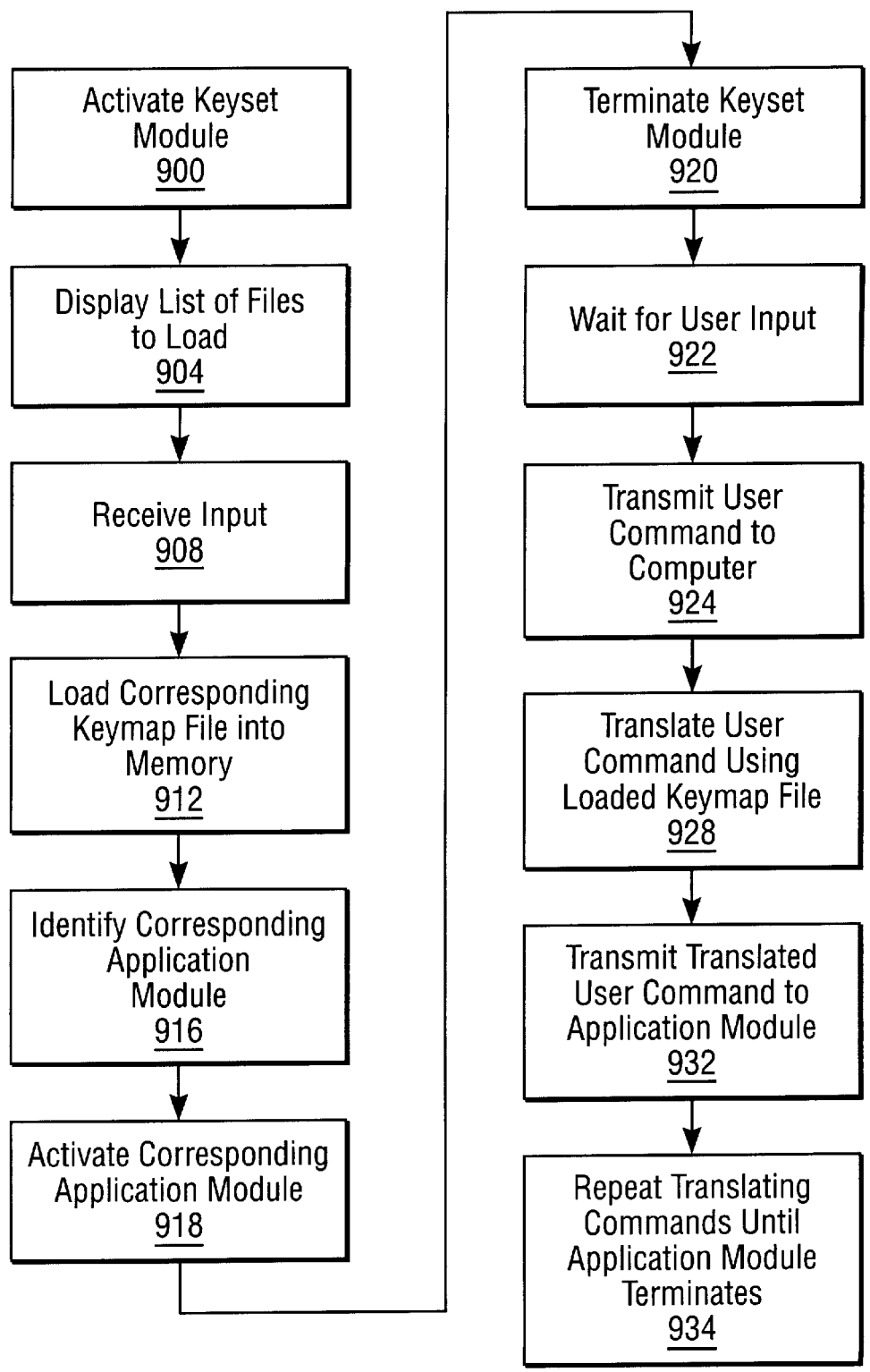
FIG. 9 is a flowchart of an alternate embodiment of the execution of the present invention where keymap files 362 are loaded through user interaction.

In an alternate embodiment, the user 340 activates the keyset module 364 to choose a keymap file 362 and to activate the corresponding application module 366. As illustrated in FIG. 9, the user 340 activates 900 the keyset module 364. The keyset module 364 displays 904 a list of keymap files 362 to choose from. The list is generated from the table 370 which is loaded into memory 312. The system receives 908 input selecting a keymap file 362. The selected keymap file 362 is retrieved from the disk 316 and loaded 912 into memory 312. The keyset module 364 then identifies 916 the application module 366 associated with that keymap file 362 by searching the table 370, and activates 918 the corresponding application module 366. At the same time, the keyset module 364 terminates 920. The translator module 368 waits 922 for user input. The game pad 100 generates a signal responsive to the user input and the signal is transmitted 924 to the translator module 368. The translator module 368 translates 928 the signal into a command recognizable by the application module 366 in accordance with the keymap file 362 loaded into memory 312, and transmits 932 the translated command to the application module 366. For example, if the user 340 selects a DVD application module 366, the keyset module 364 loads the keymap file 362 associated with the DVD-player 332, activates the DVD-player 332, and then the translator module 368 translates the user commands into commands recognizable by the DVD-player 332.

In an embodiment in which a single DVD-player drive 332 is attached to the computer 110, a DVD-keymap file 390 is created and linked to the executable file of the DVD-player drive 332. Thus, whenever the user 340 accesses the DVD-player drive, the DVD keymap file 390 is loaded into memory 312, and the game pad 100 is ready to be used to control the disk in the DVD-ROM drive 332. The translator module 368 translates signals generated by the directional pad 122 of the game pad 100 into commands following mouse protocols in accordance with the DVD-keymap file 362, and translates signals generated by the buttons 102 as commands following keyboard protocol to control DVD-player 332 functionality.

While the present invention has been described with reference to certain preferred embodiments, those skilled in the art will recognize that various modifications may be provided For example, different operating systems 354 may be used, different encoded bitstrings from ASCII representing the default keyboard and mouse commands may be assigned, or different configurations of game pad 100 may be used consistent with the scope of this invention. These and other variations upon and modifications to the preferred embodiment provided for by the present invention which is limited only by the following claims.

What is claimed is:

1. A system for controlling a digital video disk-player, the digital video-disk (DVD) player being responsive to commands issued in a mouse protocol and a keyboard protocol comprising a game pad controller having an input/output port for transmitting and receiving signals coupled to the digital video disk-player through a host computer and a plurality of input keys for generating same control signals and DVD control signals in response to manual manipulation by a user, and a translator module, resident on the host computer for translating the signals generated by the input keys into commands in mouse protocol and commands in keyboard protocol and transmitting the translated signals to an input/output port coupled to the DVD player.

2. The apparatus of claim 1 wherein the plurality of input keys include a directional key and button keys, and commands are issued in accordance with the mouse protocol in response to the directional key being pressed, and at least one command is issued in accordance with the keyboard protocol in response to one of the button keys being pressed.

3. The computer system of claim 1 wherein multiple users use a first and second game pad to control a game module, and signals generated by the game pads are translated into commands recognizable by the game module, the system comprising:
the first game pad, having a plurality of input keys coupled to the input/output port, for transmitting status information responsive to a polling request by the computer system and for transmitting an identifier bit; and
a second game pad, coupled to the first game pad and the computer system, for transmitting status information responsive to the polling request by the computer system.

4. The apparatus of claim 1, wherein the game pad is used to control an application module responsive to mouse commands, and the memory stores a keymap file for translating signals generated by the game pad into mouse commands.

5. A method for controlling a digital video disk player with a game pad in a system wherein the digital video disk player is responsive to commands issued in mouse protocol and commands issued in keyboard protocol, the game pad has a direction key and a plurality of button keys which generate signals if pressed by a user, comprising:
translating signals generated by pressing the direction key into commands in accordance with the mouse protocol;
translating signals generated by pressing one of the button keys into at least one command in accordance with the keyboard protocol; and
transmitting the translated signals to the digital video disk player.

6. A method for controlling an active application module with a game pad in a computer system having a plurality of application modules, wherein active application modules are loaded into memory, and wherein at least one active application module is a digital video disk player comprising:
identifying an application module as being active responsive to the application module being loaded into memory;
retrieving a keymap file corresponding to the identified application module and at least one retrieved keymap file is for translating signals generated by the game pad into mouse and keyboard commands recognizable by the digital video disk player;
translating signals generated by the game pad in accordance with the retrieved keymap file into commands recognizable by the active application module; and
transmitting the commands to the active application module.

7. The method of claim 6 wherein an active application module is a network browsing module, and the retrieved keymap file is for translating commands generated by the game pad into commands recognizable by the network browsing module.

8. The method of claim 6, wherein application modules are controllable by commands issued in accordance with a mouse protocol, a keyboard protocol, and a joystick protocol, further comprising:
identifying the protocol corresponding to the active application module; and
responsive to identifying that the active application module is controllable by commands issued in mouse protocol, translating commands entered into the game pad into commands compatible with the mouse protocol.

9. The method of claim 6 further comprising:
responsive to identifying that the active application module is controllable by commands issued in a joystick protocol, translating commands entered into the game pad into commands compatible with the joystick protocol.

10. The method of claim 6 in a system wherein a user activates a keyset module to select a keymap file, further comprising:
identifying an application module comprises displaying a list of application modules to be selected, in response to the user activating the keyset module;
retrieving a keymap file comprises retrieving a keymap file corresponding to one of the application modules being selected; and
translating signals generated by the game pad comprises translating signals generated by the game pad in accordance with the retrieved keymap file, in response to the selected application module being activated.

11. The method of claim 10 wherein the selected application module is activated in response to the keymap file being retrieved.

12. A method for dynamically creating a translator to translate signals generated by a game pad having a plurality of keys into commands recognizable by an application module, comprising:
displaying a list of application modules to be selected;
displaying keys to be assigned commands responsive to an application module on the list being selected;
creating a table having key entries and command entries;
receiving a command to be assigned, responsive to one of the displayed keys being selected, wherein the command is a command that is recognizable by the selected application module;
assigning the received command into a position in the table corresponding to the selected key;
repeating receiving and assigning until receiving a command to terminate command assignments; and
storing the table.

13. The method of claim 12 wherein the keys are capable of having multiple commands assigned to them.

14. The method of claim 12 wherein the commands are commands used to control a digital video disk module.

15. The method of claim 12 wherein multiple commands are assigned to a key, and pressing the key a first time transmits a first command assigned to the key, and pressing the key a second time transmits a second command assigned to the key.

16. A system for controlling a digital video disk-player, the digital video-disk player being responsive to commands issued in a mouse protocol and a keyboard protocol, the system comprising:
a game pad apparatus for controlling a game having an input/output port for transmitting to and receiving signals from the digital video disk-player through a host computer and a plurality of input keys for generating signals in response to manual manipulation by a user;
a host computer comprising:
a memory, for storing a keymap file and a translator module; and a processor, coupled to the memory, the input/output port, and the plurality of input keys, for translating the signals generated by the input keys in accordance with translator module and the keymap file into commands in mouse protocol and commands in keyboard protocol and transmitting the translated signals to the digital video player and the input/output port of the game pad apparatus.

* * * * *

UNITED STATES PATENT AND TRADEMARK OFFICE
CERTIFICATE OF CORRECTION

PATENT NO. : 6,213,880 B1
DATED : April 10, 2001
INVENTOR(S) : Wong Hoo Sim

It is certified that error appears in the above-identified patent and that said Letters Patent is hereby corrected as shown below:

<u>Claim 1,</u>
Line 8, please delete "same" and insert -- game --

Signed and Sealed this

Thirteenth Day of November, 2001

*Attest:*

*Attesting Officer*

NICHOLAS P. GODICI
*Acting Director of the United States Patent and Trademark Office*